United States Patent [19]

Dietz

[11] Patent Number: 5,323,670
[45] Date of Patent: Jun. 28, 1994

[54] CIRCULAR SAW BLADE AND PROCESS FOR THE PRODUCTION THEREOF

[75] Inventor: Hans Dietz, Ammerbuch, Fed. Rep. of Germany

[73] Assignee: Wurster u. Dietz GmbH u. Co. Maschinenfabrik, Tubingen-Derendingen, Fed. Rep. of Germany

[21] Appl. No.: 86,645

[22] Filed: Jul. 2, 1993

Related U.S. Application Data

[62] Division of Ser. No. 898,486, Jun. 15, 1992, abandoned.

[30] Foreign Application Priority Data

Jun. 19, 1991 [DE]  Fed. Rep. of Germany ....... 4120217

[51] Int. Cl.$^5$ .............................................. B23D 65/00
[52] U.S. Cl. .......................................... 76/112; 76/115
[58] Field of Search ........................... 76/27, 115, 112; 83/102.1, 676

[56] References Cited

U.S. PATENT DOCUMENTS

| | | | |
|---|---|---|---|
| 1,607,879 | 11/1926 | Drucker | 83/676 |
| 1,679,508 | 8/1928 | Stukart | 83/676 X |
| 2,111,986 | 3/1938 | Modin | 83/676 X |
| 4,085,630 | 4/1978 | Williams | 76/27 |
| 4,854,204 | 8/1989 | Faltin | 83/676 X |
| 4,875,393 | 10/1989 | Williams | 76/27 |
| 4,896,708 | 1/1990 | Dietz | 83/102.1 |

FOREIGN PATENT DOCUMENTS

1315172  6/1987  U.S.S.R. .................................. 76/27

Primary Examiner—Rinaldi I. Rada
Attorney, Agent, or Firm—Poms, Smith, Lande & Rose

[57] ABSTRACT

A circular saw blade has a rotary axis and a flat annular body arranged therearound. The annular body has a periphery being provided with teeth. The annular body is of hollow conical shape. For manufacturing the circular saw blade, an initially flat annular body is bolted into a concentric conical support element, thereby deforming the annular body into a hollow conical shape.

1 Claim, 1 Drawing Sheet

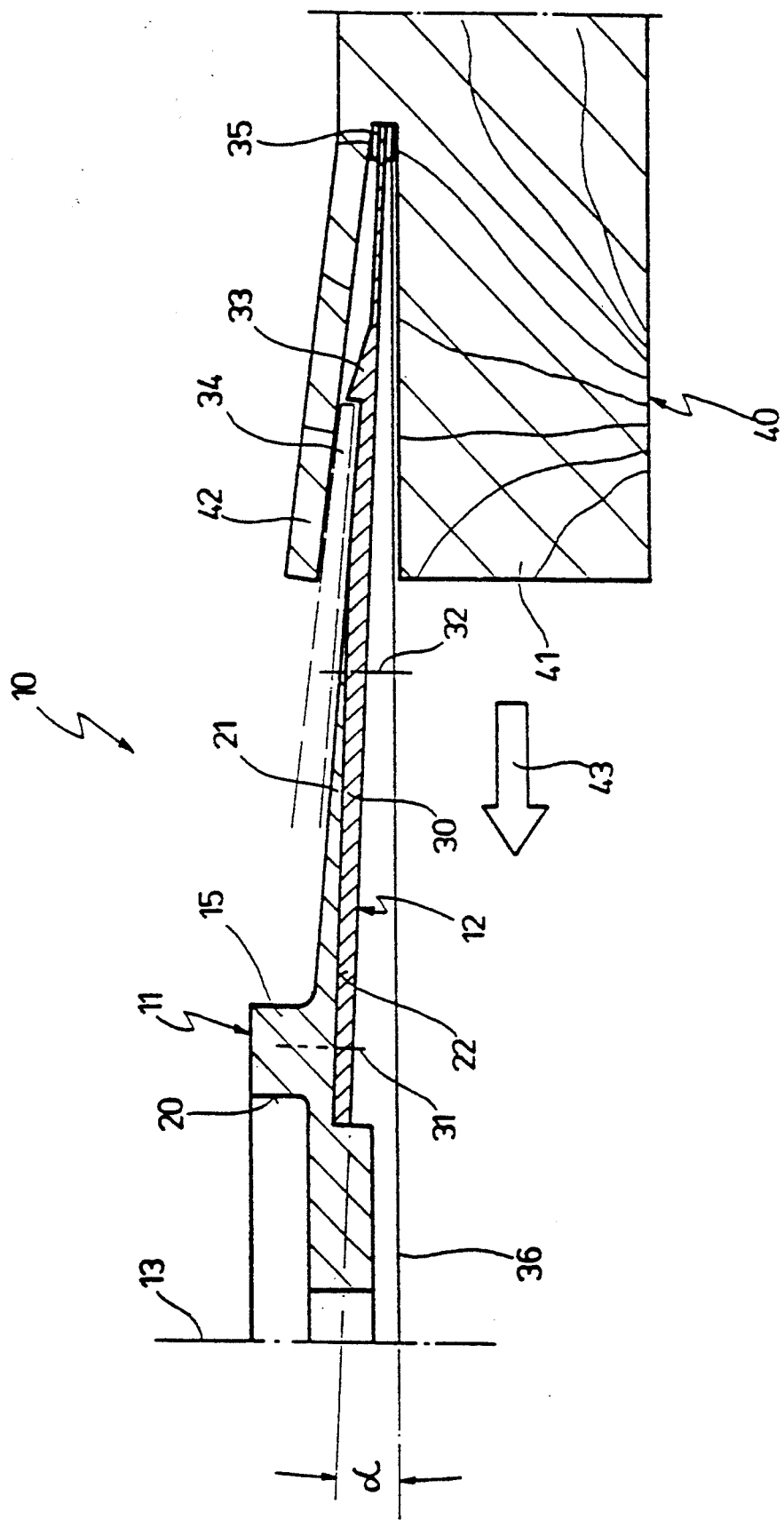

CIRCULAR SAW BLADE AND PROCESS FOR THE PRODUCTION THEREOF

This is a division of copending application Ser. No. 07/898,486 filed on Jun. 15, 1992, now abandoned.

BACKGROUND OF THE INVENTION

1. Field of the Invention

The invention concerns a circular saw blade with a rotation axis and a flat annular element, arranged around the rotation axis, which is provided with teeth on its outer edge.

The invention further concerns a process for the production of a circular saw blade using a plane, flat annular element that is provided with teeth on its periphery.

2. Description of the Prior Art

A circular saw blade of the aforesaid type is generally known, for example from WO 88/02683.

The known circular saw blade is, like other known circular saw blades, designed so that it is thickened in the region near the axis, and is flatter at its periphery. Known circular saw blades generally have a plane radial defining surface, but occasionally they are also symmetrical with respect to a radial center plane, and thus become thicker on either side of the radial center plane.

It is generally desirable in saw technology, however, to make saw kerfs as narrow as possible in order to maximize wood yield by minimizing the volume of sawdust. This is especially true if a plurality of thin boards is to be cut out of a piece of lumber, since then the kerf width is an important factor in the wood yield.

The demand for the thinnest possible kerf necessarily leads to especially thin circular saw blades. One the one hand, however, circular saw blades cannot be made arbitrarily thin, since otherwise there would be stability problems, especially if one simultaneously wishes to have high feed speeds or cutting speeds in order to cut the largest possible quantity of wood products in a certain period of time. Specifically, as the feed or cutting speed is raised, the radial load on the circular saw blade simultaneously increases, with the result that the ensuing stability problems become greater, the thinner the circular saw blade.

On the other hand, it has been proposed in the aforesaid WO 88/02683 that circular saw blades be used together with "separator elements." This is understood to mean an element that is stationary with respect to the rotating circular saw blade, that extends to a point close to the teeth of the circular saw blade, and that bends the separated side board out of the separation plane immediately after passage of the teeth, and removes it from engagement with the circular saw blade.

With circular saw blades of this kind that have a separator element, it is indeed possible to reduce further the mechanical stress on circular saw blades, but this again comes close to the limits of feasibility.

SUMMARY OF THE INVENTION

The underlying object of the invention is therefore to indicate a circular saw blade and a process for the production thereof, so as to make available a circular saw blade that satisfies even higher criteria for stability on the one hand, and thinness on the other hand.

With reference to the circular saw blade mentioned earlier, this object is achieved, according to the invention, by the fact that the annular element has a hollow conical shape.

The object underlying the invention is completely achieved in this manner because the hollow conical shape of the annular element produces a considerable increase in stability, since a hollow conical object presents much greater resistance to a radial load and does not deflect as easily as a thin saw blade arranged in a radial plane.

It is especially preferred if the hollow conical annular element has an angle of inclination between 0.1° and 2°.

The advantage of this feature is that on the one hand the desired increase in stability is achieved, and on the other hand there is only an imperceptible enlargement in the axial thickness of the saw blade.

It is furthermore especially preferred if the annular element is fastened in a concentric, cone-shaped support.

The advantage of this feature is that all the elements required for fastening and drive purposes can be provided in a support, while the annular element is merely bolted on in the edge region of the support. This feature also has the advantage that when wear occurs on the teeth, only the annular element needs to be replaced, while the support can be reused after being fitted with a new annular element.

Lastly, it is especially preferred if the annular element adjoins a stationary separator element, in such a way that a side piece separated from a main piece by the circular saw blade is bent outward from the separation plane and is distanced from the circular saw blade after the teeth pass.

This application of the circular saw blade according to the invention is especially suitable because in a circular saw with a separator element, an angle is created in any case between the main piece and the separated side piece, thus making available a wedge-shaped space for the hollow conical annular element. In this application, the angle of inclination of the hollow cone can therefore be pushed to the upper limit of what is feasible and desirable.

According to the aforesaid process, the annular element is bolted into a concentric, conical support and thereby deformed into a hollow conical shape.

The advantage of this feature is that it is essentially possible to use commercially available annular elements, in which the hollow conical shape is generated only by bolting into the support. This is easily possible in mechanical terms, since (as mentioned), the annular elements used are made as thin as possible.

It is preferred that the annular element be rolled while it is being manufactured by rolling the same, prior to fastening it to a support, along concentric circular tracks around a common axis of the annular element and the support therefore.

The advantage of this feature is that the application of more or less rolled annular zones onto the annular element makes it easier for the annular element to "fold" from its original flat position into the final hollow conical position after it is bolted into the support.

Further advantages are evident from the description and the attached drawings.

It is understood that the features described above and those yet to be explained below can be used not only in the particular combination given, but also in other combinations or in isolation, without leaving the context of the present invention.

An exemplary embodiment of the invention is depicted in the drawing and will be explained in more detail in the description which follows.

BRIEF DESCRIPTION OF THE DRAWING

The single Figure shows a radial section through an exemplary embodiment of a circular saw blade according to the invention.

DESCRIPTION OF THE PREFERRED EMBODIMENT

In the Figure, 10 designates the totality of a circular saw blade, which essentially consists of a support 11 and a thin blade 12. When installed, the circular saw blade 10 can rotate about a common axis 13 of the support 11 and blade 12.

The support 11 essentially has the function of retaining the blade 12 and attaching it to a drive shaft in a suitable manner. For this purpose, the support 11 has a central flange 15 and a suitable hole 20, so the support 11 with the blade 12 can be fastened onto a drive shaft of a circular saw.

Towards the outside, the support 11 merges into a flat edge region 21 which is inclined with respect to a radial plane by, for example, a few degrees.

One particularity of the support 11 is the fact that its underside 22 is hollowed out into a conical shape. The angle of inclination of the cone with respect to a radial plane is labeled $\alpha$ in the Figure. In practice, angle $\alpha$ can be between 0.1° and a few degrees, preferably approximately 1°. With a saw blade diameter on the order of, for example, 600 mm, this results in a cone height at the axis 13 of between 0.5 and 5 mm.

The blade 12 is bolted to the support 11 at several points, as indicated by the threaded joints 31 and 32.

At the point where the periphery of the blade 12 extends beyond the flat edge region 21 of the support 11, it is provided with an axially projecting edge 33. The edge 33 serves, in a known manner, to constitute the transition to a stationary separator element 34 which is immovable at least with respect to the rotating circular saw blade 10.

At its outer periphery, the blade 12 is provided in a known manner with teeth 35, with together define a separation plane 36.

The circular saw blade 10 is preferably used to divide up a piece of lumber 40 by separating a side piece 42, for example a side board, from a main piece 41. For this purpose, the piece of lumber 40 and the circular saw blade 10 are pushed towards one another in the direction of an arrow 43. Usually the circular saw blade 10 is located on a stationary circular saw, and the piece of lumber 40 is advanced in the direction of the arrow 43.

As the side piece 42 is separated it is deflected, after the teeth 35 pass, onto the separator element 34 by the edge 33, so that the side piece 42 from that point on is no longer in mechanical contact with the rotating circular saw blade 10.

Since the blade 12 of the circular saw blade 10 is conically deformed, the conical angle represents more or less a continuation of the separator element 34 which also runs obliquely; or, in other words, the hollow cone formed by the blade 12 is, in one configuration of a circular saw blade 10 with separator element 34, capable of penetrating into the gap that is formed in any case between the side piece 42 and main piece 41.

It has already been mentioned that the blade 12 is bolted from below against the conical underside 22 of the support 11.

This is preferably done by reshaping a blade 12, which in its original state is plane, into a hollow conical shape by bolting it onto the conical underside 22. The reason this is possible is because (in contrast to the non-scale representation in the drawing) the blade 12 is very thin and can therefore be reshaped without excessive reshaping stresses.

To promote this reshaping process, a further embodiment of the invention provides for the blade 12 to be rolled while it is being manufactured, by rolling the blade 12 along concentric circular tracks around the axis 13. This then results in annular zones of different structure, with the consequence that when the initially plane blade 12 is bolted on, it "folds" relatively easily into a conical shape.

I claim:

1. A method for manufacturing a circular saw blade, the method comprising the steps of:
    providing a planar, flat annular member having a periphery and being provided with teeth therearound;
    providing a support member having a central mounting flange and a concave conical support surface therearound, said conical support surface having a cone angle of approximately 1°;
    rolling said annular member along concentric circular tracks while maintaining its planar shape;
    inserting said planar rolled annular member into said support member to adjoin said concave conical support surface; and
    bolting said annular member onto said concave conical support surface while simultaneously transforming said annular member from its planar shape to a conical shape corresponding to said concave conical surface shape.

* * * * *